(12) United States Patent
Jeon et al.

(10) Patent No.: US 11,543,257 B2
(45) Date of Patent: Jan. 3, 2023

(54) NAVIGATION APPARATUS AND OPERATION METHOD OF NAVIGATION APPARATUS

(71) Applicant: Samsung Electronics Co., Ltd., Suwon-si (KR)

(72) Inventors: Hyun Cheol Jeon, Suwon-si (KR); Kyungboo Jung, Seoul (KR); Hojin Ju, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 196 days.

(21) Appl. No.: 16/848,330

(22) Filed: Apr. 14, 2020

(65) Prior Publication Data

US 2021/0140783 A1 May 13, 2021

(30) Foreign Application Priority Data

Nov. 12, 2019 (KR) .................. 10-2019-0144100

(51) Int. Cl.
*G01C 21/36* (2006.01)
*G01C 21/32* (2006.01)
*G06F 17/16* (2006.01)

(52) U.S. Cl.
CPC ......... *G01C 21/3635* (2013.01); *G01C 21/32* (2013.01); *G01C 21/3676* (2013.01); *G06F 17/16* (2013.01)

(58) Field of Classification Search
CPC  G01C 21/3635; G01C 21/32; G01C 21/3676; G01C 21/20; G01C 21/3602; G01C 21/3658; G01C 21/30; G01C 21/3415; G01C 21/26; G06F 17/16; G06V 20/20; G06V 20/588; G01S 19/42; G01S 19/53; G01S 19/39
See application file for complete search history.

(56) References Cited

U.S. PATENT DOCUMENTS

| | | | |
|---|---|---|---|
| 8,265,817 B2 | 9/2012 | Tener et al. | |
| 9,222,799 B1* | 12/2015 | Bell | .......................... G01S 19/15 |
| 2017/0052028 A1* | 2/2017 | Choudhury | ............ G01C 21/30 |

(Continued)

FOREIGN PATENT DOCUMENTS

| | | |
|---|---|---|
| DE | 10-2009-022-881 A1 | 12/2009 |
| DE | 10-2017-210-238 A1 | 3/2019 |

(Continued)

OTHER PUBLICATIONS

English Translation of WO2019053013A1.*
Extended European search Report dated Dec. 22, 2020 in counterpart EP Application No. 20184954.4 (12 pages in English).

*Primary Examiner* — Rami Khatib
(74) *Attorney, Agent, or Firm* — NSIP Law

(57) ABSTRACT

An operation method of a navigation apparatus includes: obtaining valid global positioning system (GPS) data at a current time point corresponding to a current position of a target device; determining first neighboring map elements corresponding to a first region indicated by the valid GPS data at the current time point from among a plurality of map elements of map data; and determining a pose parameter of the target device at the current time point based on a first direction specified by at least a portion of the first neighboring map elements.

24 Claims, 9 Drawing Sheets

(56) References Cited

U.S. PATENT DOCUMENTS

| | | | |
|---|---|---|---|
| 2017/0248429 A1* | 8/2017 | Ponomarev | G01C 21/30 |
| 2019/0186925 A1 | 6/2019 | Lee et al. | |
| 2019/0204838 A1* | 7/2019 | Haque | G05D 1/0285 |
| 2019/0383627 A1* | 12/2019 | Nangeroni | G01C 21/3461 |
| 2020/0116499 A1* | 4/2020 | Jung | G01C 21/32 |

FOREIGN PATENT DOCUMENTS

| | | | | |
|---|---|---|---|---|
| JP | 2949174 B2 | 9/1999 | | |
| JP | 2002-323551 A | 11/2002 | | |
| KR | 10-0938986 B1 | 1/2010 | | |
| KR | 10-2012-0086571 A | 8/2012 | | |
| KR | 10-1798517 B1 | 11/2017 | | |
| KR | 10-2019-0057502 A | 5/2019 | | |
| WO | WO-2019053013 A1 * | 3/2019 | | G01C 21/30 |

* cited by examiner

NAVIGATION APPARATUS AND OPERATION METHOD OF NAVIGATION APPARATUS

CROSS-REFERENCE TO RELATED APPLICATIONS

This application claims the benefit under 35 USC 119(a) of Korean Patent Application No. 10-2019-0144100 filed on Nov. 12, 2019, in the Korean Intellectual Property Office, the entire disclosure of which is incorporated herein by reference for all purposes.

BACKGROUND

1. Field

The following description relates to a navigation apparatus and an operation method of a navigation apparatus.

2. Description of Related Art

An existing navigation apparatus may provide information associated with a direction in which a vehicle travels or proceeds and with a position of the vehicle by receiving information associated with a position through a global positioning system (GPS) and matching the received information to a two-dimensional (2D) map. For matching the received information to the 2D map, there are methods of calculating a distance between the position of the vehicle obtained through the GPS and a position in a road link, and matching the position of the vehicle to a position of the vehicle in the road link having the shortest distance from the position of the vehicle, or methods of estimating a direction based on road geometry information, road connecting point information, and a rotation angle of each node and matching the estimated direction to the map. A level of accuracy of such an existing navigation apparatus may depend on such matching technology, and thus a high level of accuracy may be related to accurate matching.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an operation method of a navigation apparatus includes: obtaining valid global positioning system (GPS) data at a current time point corresponding to a current position of a target device; determining first neighboring map elements corresponding to a first region indicated by the valid GPS data at the current time point from among a plurality of map elements of map data; and determining a pose parameter of the target device at the current time point based on a first direction specified by at least a portion of the first neighboring map elements.

The first direction may be a three-dimensional (3D) direction.

The pose parameter may include a roll parameter, a pitch parameter, and a yaw parameter.

The determining of the pose parameter at the current time point based on the first direction may include identifying the first direction by performing line fitting with a plurality of points included in the first neighboring map elements and respectively corresponding to 3D positions.

The determining of the pose parameter at the current time point based on the first direction may include: determining a GPS-based yaw based on the valid GPS data at the current time point and a position of the target device at a previous time point; and extracting a sample from the first neighboring map elements by comparing a map-based yaw corresponding to each of the first neighboring map elements to the determined GPS-based yaw.

The determining of the pose parameter at the current time point based on the first direction may further include identifying the first direction by applying a random sample consensus (RANSAC) algorithm to the extracted sample.

The determining of the pose parameter at the current time point based on the first direction may include determining the pose parameter by comparing a sensor-based yaw at the current time point and a map-based yaw corresponding to the first direction. The sensor-based yaw at the current time point may be calculated by applying a yaw rate measured through a steering sensor of the target device to a yaw of the target device at a previous time point.

The pose parameter may be determined to correspond to the first direction, in response to a difference between the sensor-based yaw and the map-based yaw being less than a threshold value.

The operation method may further include: determining a direction cosine matrix (DCM) corresponding to the determined pose parameter of the target device at the current time point; and determining a velocity parameter of the target device at the current time point by applying the DCM to a velocity vector corresponding to a velocity of the target device at the current time point that is measured through a velocity sensor of the target device.

The operation method of may further include: determining a map-based lane by matching the valid GPS data at the current time to the map data; determining a sensor-based lane by applying a lane change trigger to a sensor-based position of the target device at the current time point that is calculated by applying dead reckoning (DR) to a position of the target device at a previous time point; and determining a position parameter of the target device at the current time point by comparing the map-based lane and the sensor-based lane.

The operation may further include: generating the lane change trigger by comparing a lane width and a change in a position of the target device in a lateral direction.

The operation method may further include determining whether the valid GPS data is obtained.

The operation method of claim 12, wherein the determining of whether the valid GPS data is obtained includes: obtaining GPS data at the current time point corresponding to the current position of the target device; determining a GPS-based velocity and a GPS-based yaw rate based on the obtained GPS data at the current time point; obtaining a sensor-based velocity measured through a velocity sensor of the target device and a sensor-based yaw rate measured through a steering sensor of the target device; and determining validity of the GPS data based on a result of comparing the GPS-based velocity and the sensor-based velocity with a result of comparing the GPS-based yaw rate and the sensor-based yaw rate.

In another general aspect, a non-transitory computer-readable storage medium stores instructions that, when executed by a processor, cause the processor to perform the operation described above.

In another general aspect, an operation method of a navigation apparatus includes: obtaining a sensor-based position at a current time point that is calculated by applying dead reckoning (DR) to a previous position of a target device and corresponds to a current position of the target device, in response to valid global positioning system (GPS) data at the current time point corresponding to the current position of the target device not being obtained; determining neighboring map elements corresponding to a region indicated by the sensor-based position at the current timepoint from among a plurality of map elements; and determining a pose parameter of the target device at the current time point based on a direction specified by at least a portion of the neighboring map elements.

The determining of the pose parameter at the current time point based on the direction may include identifying the direction by performing line fitting with a plurality of points that are included in the neighboring map elements and respectively correspond to 3D positions.

The determining of the pose parameter at the current time point based on the direction may include identifying the direction by applying a RANSAC algorithm to the neighboring map elements.

The determining of the pose parameter at the current time point based on the direction may include: determining a pitch and a roll in the pose parameter based on the direction; and determining a yaw in the pose parameter by applying a yaw rate measured through a steering sensor of the target device to a yaw of the target device at a previous time point.

In another general aspect, a navigation apparatus includes a processor configured to: obtain valid global positioning system (GPS) data at a current time point corresponding to a current position of a target device; determine first neighboring map elements corresponding to a first region indicated by the valid GPS data at the current time point from among a plurality of map elements of map data; and determine a pose parameter of the target device at the current time point based on a first direction specified by at least a portion of the first neighboring map elements.

The processor may be further configured to: identify the first direction by performing line fitting with a plurality of points that are included in the first neighboring map elements and respectively correspond to three-dimensional (3D) positions.

The processor may be further configured to: determine a GPS-based yaw based on the valid GPS data at the current time point and a position of the target device at a previous time point; and extract a sample from the first neighboring map elements by comparing a map-based yaw corresponding to each of the first neighboring map elements to the determined GPS-based yaw.

The processor may be further configured to identify the first direction by applying a random sample consensus (RANSAC) algorithm to the extracted sample.

The processor may be further configured to determine the pose parameter by comparing a sensor-based yaw at the current time point and a map-based yaw corresponding to the first direction. The sensor-based yaw at the current time point may be calculated by applying a yaw rate measured through a steering sensor of the target device to a yaw of the target device at a previous time point.

The precision navigation apparatus of claim 23, wherein the pose parameter is determined to correspond to the first direction, in response to a difference between the sensor-based yaw and the map-based yaw being less than a threshold value.

The processor may be further configured to, in response to the valid GPS data at the current time point not being obtained: obtain a sensor-based position at the current time point that is calculated by applying dead reckoning (DR) to a previous position of the target device and corresponds to the current position of the target device; determine second neighboring map elements corresponding to a second region indicated by the obtained sensor-based position at the current time point from among the plurality of map elements; and determine the pose parameter of the target device at the current time point based on a second direction specified by at least a portion of the second neighboring map elements.

The processor may be further configured to: determine a direction cosine matrix (DCM) corresponding to the determined pose parameter of the target device at the current time point; and determine a velocity parameter of the target device at the current time point by applying the DCM to a velocity vector corresponding to a velocity of the target device at the current time point that is measured through a velocity sensor of the target device.

The processor may be further configured to: determine a map-based lane by matching the valid GPS data at the current time point to the map data; determine a sensor-based lane by applying a lane change trigger to a sensor-based position of the target device at the current time point that is calculated by applying dead reckoning (DR) to a position of the target device at a previous time point; and determine a position parameter of the target device at the current time point by comparing the map-based lane and the sensor-based lane.

The processor may be further configured to generate the lane change trigger by comparing a change in a position of the target in a lateral direction, and a lane width.

The navigation apparatus may further include: a memory storing instructions, wherein the processor is configured to execute the instructions to perform the obtaining of the valid global positioning system (GPS) data, the determining of the first neighboring map elements, and the determining of the pose parameter.

Other features and aspects will be apparent from the following detailed description, the drawings, and the claims.

Figure 1:
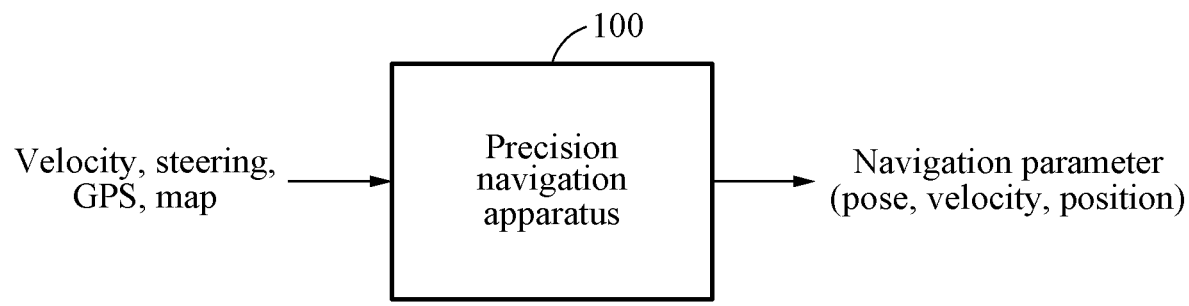
FIG. 1 is a diagram illustrating an example of an input and an output of a navigation apparatus.

Throughout the drawings and the detailed description, the same reference numerals refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of this application. Terms, such as those defined in commonly used dictionaries, are to be interpreted as having a meaning that is consistent with their meaning in the context of the relevant art and the disclosure of this application and are not to be interpreted in an idealized or overly formal sense unless expressly so defined herein.

The features of the examples described herein may be combined in various ways as will be apparent after an understanding of the disclosure of this application. Further, although the examples described herein have a variety of configurations, other configurations are possible as will be apparent after an understanding of the disclosure of this application.

Also, in the description of example embodiments, detailed description of structures or functions that are thereby known after an understanding of this application may be omitted.

FIG. 1 is a diagram illustrating an example of an input and an output of a precision navigation apparatus.

Referring to FIG. 1, a precision navigation apparatus 100 (hereinafter, "navigation apparatus 100") may provide precise information associated with a physical state of a target device. For example, the navigation apparatus 100 may provide a navigation parameter indicating any one or any combination of any two or more of a pose, a velocity, and a position based on any one or any combination of any two or more of velocity data, steering data, global positioning system (GPS) data, and map data. In this example, the steering data may include steering angle data.

The target device may include various devices that may need precise state information. For example, the target device may be one of various types of augmented reality (AR) devices including, for example, an augmented reality head-up display (AR HUD) device, a vehicle including an AR HUD, a mobile device providing AR, and the like. The AR device may display a real background overlaid with a virtual image based on a state of the AR device. To embody an AR environment without an error, the AR device may need to accurately measure the state of the AR. For another example, the target device may be an autonomous vehicle that needs precise positioning.

The navigation parameter may be applied in various fields of applications. For example, the navigation parameter may be used to provide a user with navigation information, provide an autonomous vehicle with travel control information, and the like. In an example, the navigation parameter may be used in an initial term of sensor fusion. The sensor fusion is a method of combining a plurality of various types of sensors into one and providing a solution. For example, the sensor fusion may be used for determining a pose, a velocity, and a position of a vehicle.

When an output of the sensor fusion converges on a true value, the sensor fusion may produce a relatively accurate output. However, when initial information with a relatively great error is provided to the sensor fusion, a relatively long period of time may be needed for an output of the sensor fusion to converge on a true value. For example, in such a case, an AR device may fail to match a virtual image to a real background for such a long period of time. The navigation apparatus 100 may generate a relatively accurate navigation parameter, and the generated accurate navigation parameter may be used in the initial term of the sensor fusion to improve performance of the sensor fusion in terms of accuracy. For example, the navigation parameter of the navigation apparatus 100 may be used as initial information for the sensor fusion, and then provided for the sensor fusion for a period of time until an output of the sensor fusion converges a the true value.

As described above, the navigation apparatus 100 may use velocity data, steering data, GPS data, and map data to generate a navigation parameter. For example, the map data used herein may be based on a high-definition (HD) map. The HD map may include information associated with various elements, for example, lanes, centerlines, and traffic signs or markings, that are generated based on various sensors. These various elements of the HD map may be represented by point cloud, and each point in the point cloud may correspond to a three-dimensional (3D) position. The navigation apparatus 100 may generate a precise navigation parameter including a 3D pose, a 3D velocity, and a lane-level position using such an HD map.

In addition, the velocity data, the steering data, and the GPS data that are used to generate the navigation parameter may be obtained respectively through a velocity sensor, a steering sensor, and a GPS receiver that are generally used in a vehicle or a mobile device. The velocity sensor may include an odometer, for example. The steering sensor may include a steering wheel and a gyroscope, for example. Thus, implementing the precision navigation system 100 may not need some additional and expensive sensors such as a light detection and ranging (LiDAR) sensor, for example.

Figure 2:
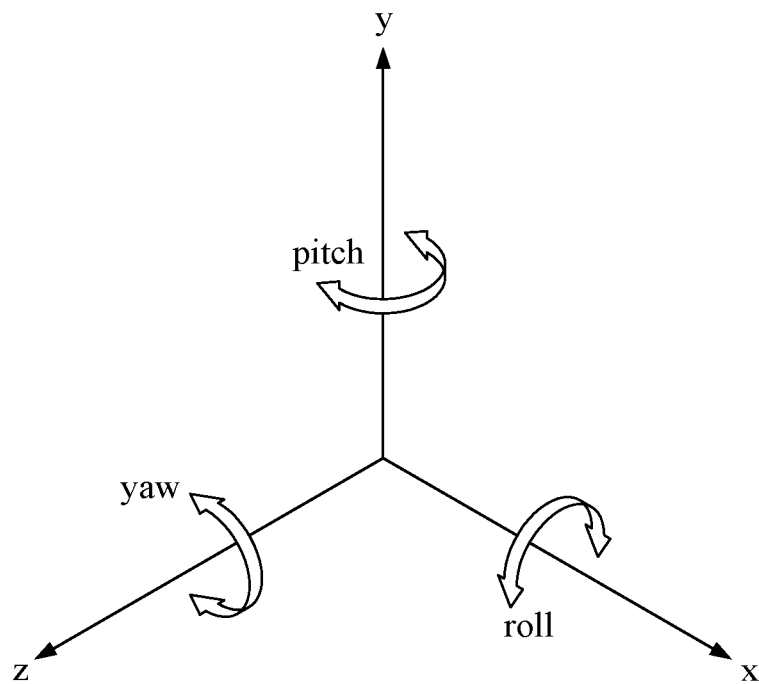
FIG. 2 is a diagram illustrating an example of a pose parameter.

FIG. 2 is a diagram illustrating an example of a pose parameter. Referring to FIG. 2, illustrated is an x-y-z 3D coordinate space. A pose parameter may include a roll parameter, a pitch parameter, and a yaw parameter. The roll parameter may indicate an inclination with respect to an x axis. The pitch parameter may indicate an inclination with respect to a y axis. The yaw parameter may indicate an inclination with respect to a z axis. The x axis may correspond to a direction in which a target device travels or proceeds, for example.

A pose of the target device may be indicated by a line corresponding to a 3D direction. In such a case, the roll parameter may correspond to a value of c in a two-dimensional (2D) line, for example, z=cy, that is obtained by projecting the corresponding 3D line to a zy plane. The pitch parameter may correspond to a value of b in a 2D line, for example, z=bx, that is obtained by projecting the corresponding 3D line to an xz plane. The yaw parameter may correspond to a value of a in a 2D line, for example, y=ax, that is obtained by projecting the corresponding 3D line to an xy plane.

Hereinafter, the roll parameter, the pitch parameter, and the yaw parameter will be indicated by φ, θ, and ψ, respectively. In addition, a yaw may also be referred to as a heading.

Figure 3:
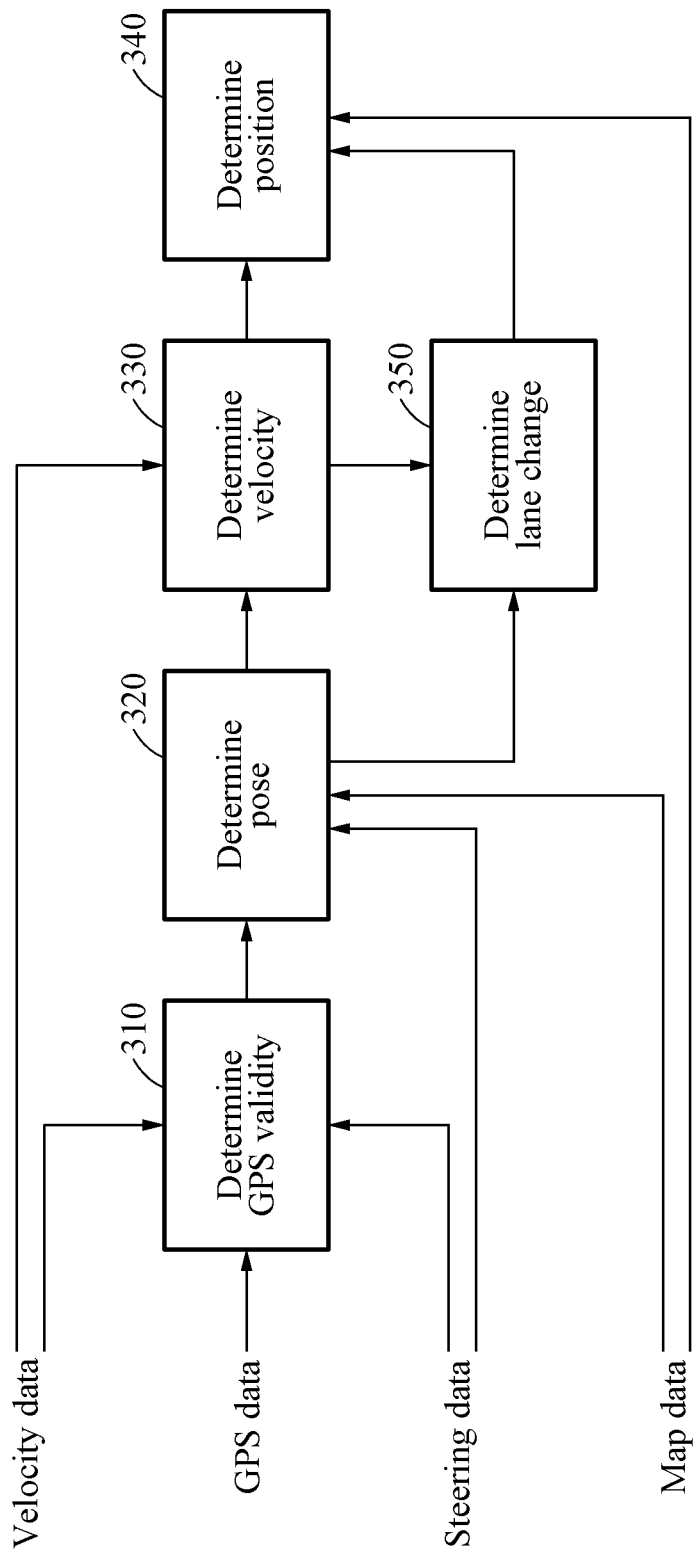
FIG. 3 is a diagram illustrating an example of an operation of a navigation apparatus.

FIG. 3 is a diagram illustrating an example of an operation of a navigation apparatus. Referring to FIG. 3, in operation 310, a navigation apparatus determines GPS validity. Based on a result of operation 310, it may be determined whether valid GPS data is obtained.

A circumstance in which the valid GPS data is obtained may include a case in which GPS data is received and the received GPS data is valid. A circumstance in which the valid GPS data is not obtained may include a case in which GPS data is received and the received GPS data is not valid, or a case in which GPS data is not received. GPS data may be received periodically based on a preset reception period, for example, 1 second. The case in which the GPS data is not received may include a case in which GPS data is not received due to a communication failure when the reception period elapses, and a case in which GPS data is not received between reception periods. For example, the case in which GPS data is not received between reception periods may be a case in which other data is needed to replace GPS data between GPS reception periods, as in a case in which a frame rate of an AR image exceeds 1 frame per second (fps).

The navigation apparatus may determine the validity of the GPS data by comparing a GPS-based velocity and a GPS-based yaw rate to a sensor-based velocity and a sensor-based yaw rate, respectively. The GPS-based velocity and the GPS-based yaw rate are a velocity and a yaw rate, respectively, that are measured using the GPS data. The sensor-based velocity and the sensor-based yaw rate are a velocity and a yaw rate, respectively, that are measured using a sensor, for example, a velocity sensor and a steering sensor.

For example, the navigation apparatus may obtain GPS data at a current timepoint corresponding to a current position of a target device, and determine a GPS-based velocity and a GPS-based yaw rate based on the obtained GPS data at the current time point. In addition, the precision navigation apparatus may obtain a sensor-based velocity measured through a velocity sensor of the target device, and a sensor-based yaw rate measured through a steering sensor of the target device. The navigation apparatus may then determine validity of the GPS data based on a result of comparing the GPS-based velocity and the sensor-based velocity and a result of comparing the GPS-based yaw rate and the sensor-based yaw rate. When a difference between the GPS-based velocity and the sensor-based velocity and a difference between the GPS-based yaw rate and the sensor-based yaw rate are all less than respective threshold values, the navigation apparatus may determine that the GPS data is valid. Hereinafter, an example of determining validity of GPS data will be described in detail with reference to FIG. 4.

Figure 4:
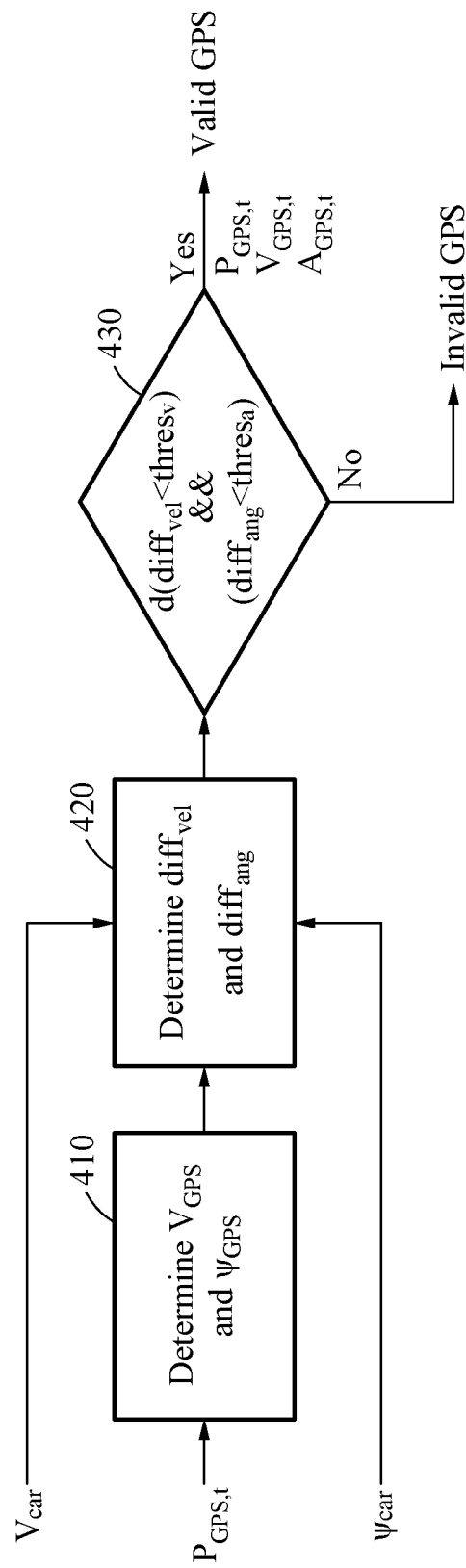
FIG. 4 is a diagram illustrating an example of determining validity of global positioning system (GPS) data.

FIG. 4 is a diagram illustrating an example of determining validity of GPS data. A navigation apparatus may determine validity of GPS data by referring to a highly robust sensor, for example, a velocity sensor and a steering sensor. Referring to FIG. 4, in operation 410, the navigation apparatus may determine a GPS-based velocity $V_{GPS}$ and a GPS-based yaw $\psi_{GPS}$ based on a position $P_{GPS,t}$ corresponding to GPS data at a current time point. For example, the GPS-based velocity $V_{GPS}$ and the GPS-based yaw $\psi_{GPS}$ may be determined as represented by Equations 1 and 2.

$$V_{GPS} = \frac{P_{GPS,t} - P_{GPS,t-1}}{\Delta t} \quad \text{[Equation 1]}$$

$$\psi_{GPS} = \tan^{-1} \frac{V_{GPS,lon}}{V_{GPS,lat}} \quad \text{[Equation 2]}$$

In Equation 1, $P_{GPS,t-1}$ is a position corresponding to GPS data at a previous time point t-1. $\Delta t$ is a difference between a current time point t and the previous time point t-1, and corresponds to a processing period of the navigation apparatus. For example, the navigation apparatus may generate a navigation parameter each $\Delta t$.

In this example, GPS data may include information associated with a latitude, a longitude, and an altitude, and thus a position corresponding to the GPS data may be a 3D position. In Equation 2, $V_{GPS,lon}$ is a GPS-based measured velocity in a longitudinal direction, and $V_{GPS,lat}$ is a GPS-based measured velocity in a latitudinal direction. Thus, the velocities $V_{GPS,lon}$ and $V_{GPS,lat}$ may respectively correspond to a longitudinal component and a latitudinal component of a velocity $V_{GPS}$.

In operation 420, the navigation apparatus may determine a velocity difference $\text{diff}_{vel}$ and an angle difference $\text{diff}_{ang}$. The velocity difference $\text{diff}_{vel}$ and the angle difference $\text{diff}_{ang}$ may be determined as represented by Equations 3 and 4.

$$\text{diff}_{vel} = |\|V_{GPS}\| - V_{car}| \quad \text{[Equation 3]}$$

$$\text{diff}_{ang} = |\dot{\psi}_{GPS} - \dot{\psi}_{car}| \quad \text{[Equation 4]}$$

In Equation 3, $\|V_{GPS}\|$ is a magnitude of $V_{GPS}$, and $V_{car}$ is a velocity of a target device that is measured through a velocity sensor of the target device. In Equation 4, $\dot{\psi}_{GPS}$ is a GPS-based yaw rate, and $\dot{\psi}_{car}$ is a sensor-based yaw rate. The GPS-based yaw rate may be determined based on a GPS-based yaw at a previous time point and a GPS-based yaw at a current time point. The sensor-based yaw rate may be measured through a steering sensor of the target device.

In operation 430, the navigation apparatus may compare a velocity difference $\text{diff}_{vel}$ and an angle difference $\text{diff}_{ang}$ with respective threshold values $\text{thres}_v$ and $\text{thres}_a$.

When the velocity difference $\text{diff}_{vel}$ is less than the threshold value $\text{thres}_v$ and the angle difference $\text{diff}_{ang}$ is less than the threshold value $\text{thres}_a$, the navigation apparatus may determine that the GPS data at the current time point is valid. In contrast, when the velocity difference $\text{diff}_{vel}$ is greater than the threshold value $\text{thres}_v$ and the angle difference $\text{diff}_{ang}$ is greater than the threshold value $\text{thres}_a$, the navigation apparatus may determine that the GPS data at the current time point is not valid.

Referring back to FIG. 3, in operation 320, the navigation apparatus may determine a pose parameter. For example, the navigation apparatus obtains valid GPS data at a current time point corresponding to a current position of a target device, and determines first neighboring map elements corresponding to a first region indicated by the valid GPS data at the current time point from among a plurality of map elements of map data. For example, a circumstance in which the first neighboring map elements correspond to the first region may also indicate that the first neighboring map elements are included in the first region. The first region may be a region in a range, for example, 10 meters (m), from a position indicated by the valid GPS data at the current time point. Subsequently, the navigation apparatus may determine the pose parameter of the target device at the current time point based on a first direction indicated by at least a portion of the first neighboring map elements.

As described above, the map data may be based on an HD map. The HD map may include various map elements including, for example, lanes, centerlines, and traffic signs and markings. The map elements in the HD map may be represented by point cloud, and each point of the point cloud may correspond to a 3D position.

The navigation apparatus may perform line fitting on a plurality of points included in the first neighboring map elements, and identify a direction of each of the first neighboring map elements. As described above, each point may correspond to a 3D position, and thus a direction of each of the first neighboring map elements may also correspond to a 3D direction. The navigation apparatus may identify the first direction based on a result of the line fitting.

The navigation apparatus may identify the first direction by selecting at least a portion of the first neighboring map elements from among the first neighboring map elements. Through such a selection, map elements that are closely and actually associated with the target device may be selected as neighboring map elements. For example, when a vehicle passes through an intersection, a map element irrelevant to a travel direction of the vehicle, for example, a lane in a clockwise direction or a right-turn direction, may be selected as a neighboring map element. Such a neighboring map element may be irrelevant to an actual travel direction of the vehicle, and may thus have an influence as an error in indicating a pose of the vehicle. Thus, through the selection, such an error element may be eliminated, and accuracy of the pose parameter may be improved.

For example, the navigation apparatus may determine a GPS-based yaw based on the valid GPS data at the current time point and a position of the target device at a previous time point. In this example, the position of the target device at the previous time point may be based on valid GPS data at the previous time point. However, when the valid GPS data is not present at the previous time point, the position of the target device at the previous time point may be calculated by applying dead reckoning (DR) to valid GPS data at a further previous time point.

The navigation apparatus may then compare a map-based yaw corresponding to each of the first neighboring map elements with the determined GPS-based yaw, and extract a sample from the first neighboring map elements. As described above, a 3D direction corresponding to each of the first neighboring map elements may be determined as a result of the line fitting performed on the first neighboring map elements. In addition, as described above with reference to FIG. 2, a map-based yaw corresponding to each of the first neighboring map elements may be determined by projecting, to an xy plane, a line corresponding to the 3D direction. The navigation apparatus may then extract, as a sample, a first neighboring map element corresponding to a map-based yaw of which a difference from the GPS-based yaw is less than a threshold value.

In addition, the navigation apparatus may identify the first direction by applying a random sample consensus (RANSAC) algorithm to samples extracted as described above. Through the RANSAC algorithm, averaging of samples having high similarities to each other among the samples may be performed, and a direction corresponding to a result of the RANSAC algorithm may be identified as the first direction. Thus, a neighboring element obstructive of pose estimation of the target device among the samples may be additionally eliminated, and thus the first direction may be more likely to correspond to an actual pose of the target device.

The navigation apparatus may determine a map-based first yaw parameter, a map-based first pitch parameter, and a map-based first roll parameter, based on the first direction. The navigation apparatus may determine each of the parameters by projecting a 3D line corresponding to the first direction to each 2D plane as described above with reference to FIG. 2. Alternatively, the navigation apparatus may determine each of the parameters by performing line fitting, on each 2D plane, with points included in the first neighboring map elements corresponding to the first direction.

In addition, the navigation apparatus may determine the pose parameter by verifying the map-based first yaw parameter, the map-based first pitch parameter, and the map-based first roll parameter. For example, the navigation apparatus may determine the pose parameter by comparing a sensor-based yaw at a current time point and the map-based first yaw corresponding to the first direction. In this example, the sensor-based yaw at the current time point may be calculated by applying, to a yaw of the target device at a previous timepoint, a yaw rate that is measured through a steering sensor of the target device.

When a difference between the sensor-based yaw and the map-based first yaw is less than a threshold value, the navigation apparatus may determine the pose parameter to correspond to the first direction. That is, the navigation apparatus may determine the map-based first yaw parameter, the map-based first pitch parameter, and the map-based first roll parameter to be the pose parameter. When the difference between sensor-based yaw and the map-based first yaw is greater than the threshold value, the navigation apparatus may determine a separately determined sensor-based yaw parameter, a map-based second pitch parameter, and a map-based second roll parameter to be the pose parameter. The sensor-based yaw parameter, the map-based second pitch parameter, and the map-based second roll parameter may be used when valid GPS data is not obtained, and determining the sensor-based yaw parameter, the map-based second pitch parameter, and the map-based second roll parameter will be described in greater detail hereinafter.

When the valid GPS data at the current time point is not obtained, the navigation apparatus may obtain a sensor-based position at the current time point corresponding to a current position of the target device. The sensor-based position at the current time point may be calculated by applying DR to a previous position of the target device. For example, the navigation apparatus may calculate the sensor-based position at the current time point by applying, to the previous position of the target device, the DR that is based on velocity data and steering data.

Subsequently, the navigation apparatus may determine second neighboring map elements corresponding to a second region indicated by the sensor-based position at the current time point from among a plurality of map elements of map data, and determine the pose parameter of the target device at the current time point based on a second direction indicated by at least a portion of the second neighboring map elements. The navigation apparatus may identify the second direction by performing line fitting with a plurality of points included in the second neighboring map elements.

However, when the valid GPS data is not obtained, a GPS-based yaw may not be calculated, and thus a RANSAC may be performed without additional sampling. For example, the navigation apparatus may identify the second direction by applying a RANSAC algorithm to the second neighboring map elements. Subsequently, the navigation apparatus may determine the map-based second pitch parameter and the map-based second roll parameter based on the second direction. In this example, a yaw parameter may be separately calculated based on DR. For example, the navigation apparatus may determine a sensor-based yaw parameter by applying a yaw rate measured through the steering sensor of the target device to a yaw of the target device at a previous time point. The navigation apparatus may then determine the sensor-based yaw parameter, the map-based second pitch parameter, and the map-based second roll parameter to be the pose parameter.

Figure 5:
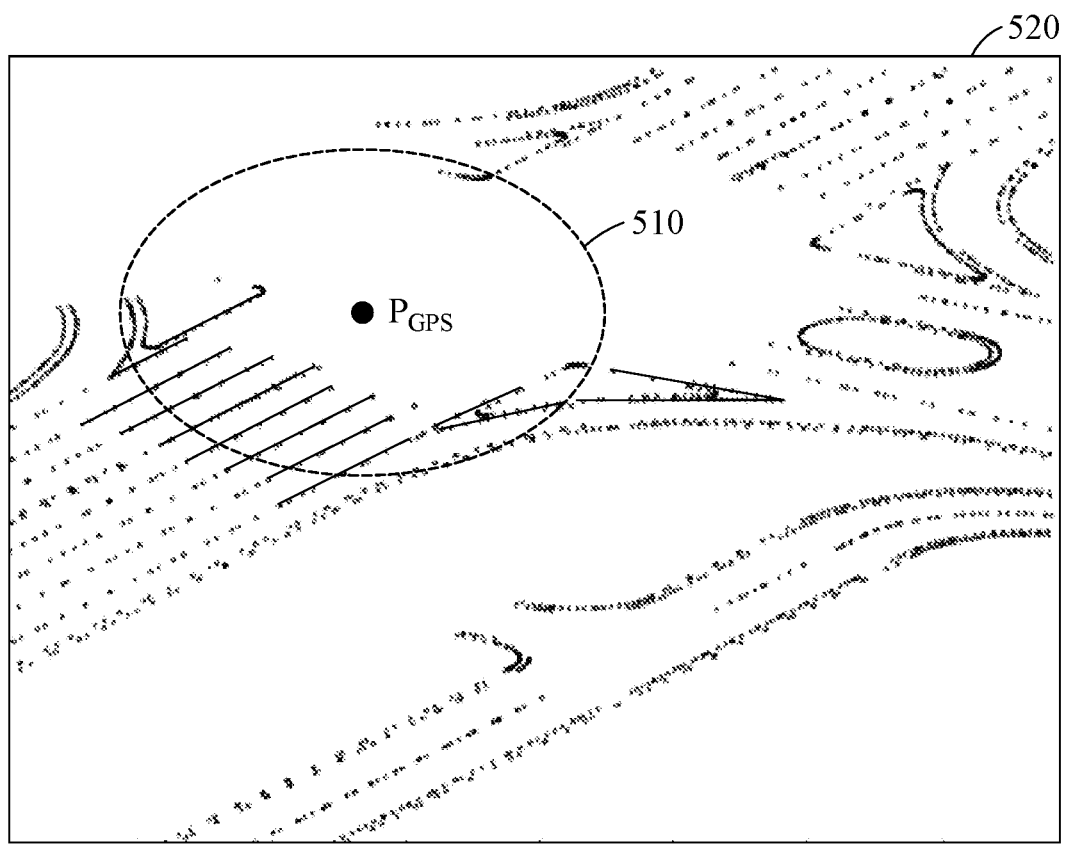
FIG. 5 is a diagram illustrating an example of map data.

FIG. 5 is a diagram illustrating an example of map data. Referring to FIG. 5, map data 520 includes various map elements such as, for example, lanes, centerlines, traffic signs and markings, and the like. The map elements in the map data 520 may be represented by a point cloud. A GPS-based position $P_{GPS}$ may be specified on the map data 520 based on GPS data, and a region including the GPS-based position $P_{GPS}$ may be set to be a first region 510. A map element corresponding to the first region 510 may be selected as a first neighboring map element. However, when a valid GPS signal is not received, a sensor-based position may be specified on the map data 520, and a second region including the sensor-based position may be set in order to determine a second neighboring map element.

Figure 6:
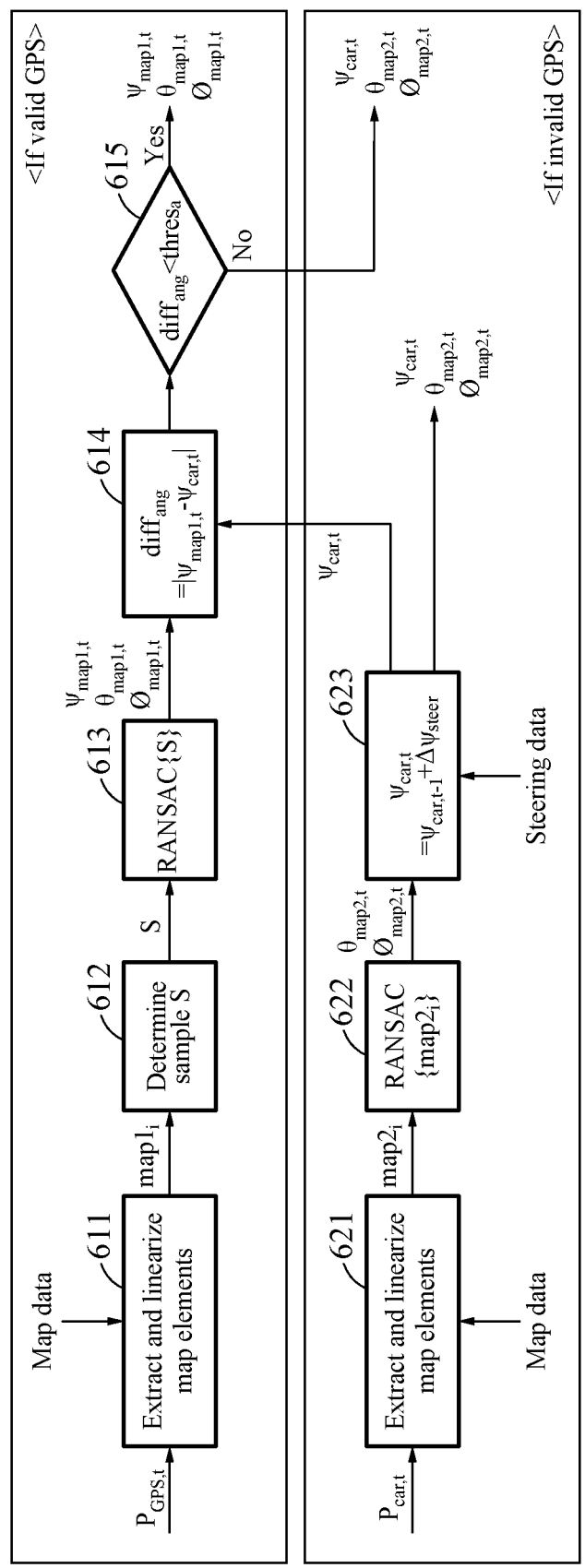
FIG. 6 is a diagram illustrating an example of determining a pose parameter.

FIG. 6 is a diagram illustrating an example of determining a pose parameter. Referring to FIG. 6, operations 611 through 615 to be described hereinafter may correspond to a case in which valid GPS data is obtained, and operations 621 through 623 to be described hereinafter may correspond to a case in which valid GPS is not obtained. Even in such a case in which the valid GPD data is obtained, some of operations 621 through 623 may also be performed to provide data needed to perform operations 611 through 615.

In operation 611, a navigation apparatus may determine first neighboring map elements $map1_i$ based on a GPS-based position $P_{GPS,t}$ corresponding to valid GPS data at a current time point, and on map data. In operation 612, the navigation apparatus determines a sample S from the first neighboring map elements $map1_i$. The navigation apparatus may determine the sample S as represented by Equation 5.

$$S = \left\{ \begin{array}{c} map_i \mid \\ \psi_{map,i} - \psi_{gps} < thres \end{array} \right\} \qquad \text{[Equation 5]}$$

In Equation 5, $\psi_{map,i}$ is a map-based yaw corresponding to each of the first neighboring map elements $map1_i$. $\psi_{GPS}$ is a GPS-based yaw, and thres is a threshold value. In addition, i is an identifier to identify each of the first neighboring map elements $map1_i$. In this example, a neighboring map element $map_i$ corresponding to a map-based yaw $\psi_{map,i}$, of which a difference from the GPS-based yaw $\psi_{GPS}$ is less than the threshold value, may be determined to be the sample S.

In operation 613, the navigation apparatus may determine a map-based first yaw parameter $\psi map_{1,t}$, a map-based first pitch parameter $\theta_{map1,t}$, and a map-based first roll parameter $\varphi_{map1,t}$ by performing a RANSAC on the sample S. Hereinafter, the determined map-based first yaw parameter $\psi_{map1,t}$, map-based first pitch parameter $\theta_{map1,t}$ and map-based first roll parameter $\varphi_{map1,t}$ will be referred to as a "first parameter group" for convenience of description.

In operations 614 and 615, the navigation apparatus may verify the first parameter group. For example, the navigation apparatus calculates an angle difference $diff_{ang}$ between a sensor-based yaw parameter $\psi_{car,t}$ and the map-based first yaw parameter $\psi_{map1,t}$ in operation 614, and compares the angle difference $diff_{ang}$ with the threshold value $thres_a$ in operation 615. The sensor-based $\psi_{car,t}$ may be calculated in operation 623.

When the angle difference $diff_{ang}$ is less than the threshold value $thres_a$, the first parameter group may be determined to be a pose parameter at the current time point. When the angle difference $diff_{ang}$ is greater than the threshold value $thres_a$, a second parameter group may be determined to be the pose parameter at the current time point. In this example, the second parameter group may include the sensor-based yaw parameter $\psi_{car,t}$, a map-based second pitch parameter $\theta_{map2,t}$, and a map-based second roll parameter $\varphi_{map2,t}$. The map-based second pitch parameter $\theta_{map2,t}$ and the map-based second roll parameter $\varphi_{map2,t}$ may be calculated in operation 622.

In operation 621, the navigation apparatus may determine second neighboring map elements $map2_i$ based on a sensor-based position $P_{car,t}$ at the current time point and the map data. The sensor-based position $P_{car,t}$ may be calculated by applying DR that is based on velocity data and steering data to a previous position of a target device at a previous time point. In operation 622, the navigation apparatus may determine the map-based second pitch parameter $\theta_{map2,t}$ and the map-based second roll parameter $\varphi_{map2,t}$ by performing a RANSAC on the second neighboring map elements $map1_2$.

In operation 623, the navigation apparatus may determine the sensor-based yaw parameter $\psi_{car,t}$ at the current time point by applying a yaw rate $\Delta\psi_{steer}$ to a yaw parameter $\psi_{car,t-1}$ at the previous time point. In this example, the yaw rate $\Delta\psi_{steer}$ may correspond to a variation $\Delta\psi_{steer}$ in steering data during $\Delta t$, and be measured through a steering sensor of the target device. When the valid GPS data is not obtained, the second parameter group including the sensor-based yaw parameter $\psi_{car,t}$, the map-based second pitch parameter $\theta_{map2,t}$, and the map-based roll parameter $\varphi_{map2,t}$ may be determined to be the pose parameter at the current time input.

Referring back to FIG. 3, the navigation apparatus determines a velocity parameter. The navigation apparatus may determine a velocity parameter at a current time point using a pose parameter at a current time point that is determined in operation 320. For example, the navigation apparatus may determine a direction cosine matrix (DCM) corresponding to the pose parameter at the current time point, and determine the velocity parameter at the current time point by applying the DCM to a velocity vector corresponding to a velocity of the target device at the current time point that is measured through a velocity sensor of the target device.

Figure 7:
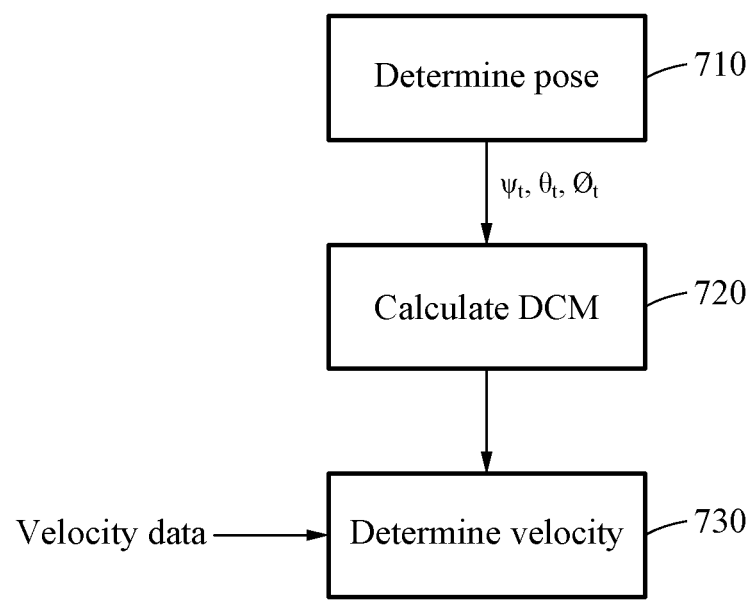
FIG. 7 is a diagram illustrating an example of determining a velocity parameter.

FIG. 7 is a diagram illustrating an example of determining a velocity parameter. Referring to FIG. 7, in operation 710, a navigation apparatus determines a pose parameter including, for example, $\psi_t$, $\theta_t$, and $\varphi_t$. Operation 710 may correspond to operation 320 described above with reference to FIG. 3. In operation 720, the navigation apparatus may calculate a DCM corresponding to the pose parameter including $\psi_t$, $\theta_t$, and $\varphi_t$. In operation 730, the navigation apparatus may determine a velocity parameter based on velocity data and the DCM. In operation 730, the following equation 6 may be used.

$$\begin{bmatrix} V_N \\ V_E \\ V_D \end{bmatrix} = C_b^n \begin{bmatrix} V \\ 0 \\ 0 \end{bmatrix} \quad \text{[Equation 6]}$$

In Equation 6, $V_N$, $V_E$, and $V_D$ are a velocity in a northward direction, a velocity in an eastward direction, and a velocity in a downward direction, respectively. In addition, V is velocity data and $c_b^n$ is a DCM. Through Equation 6, a 3D velocity vector corresponding to the velocity parameter may be obtained.

In general, GPS data may have relatively inaccurate altitude information, and thus it may not be easy to apply corresponding GPS information as a 3D velocity of a vehicle. In addition, even though highly accurate GPS data is received, it may not be easy to obtain the 3D velocity due to a minute horizontal error. However, according to an example embodiment, it may be possible to obtain a relatively accurate 3D velocity vector using a highly accurate pose parameter.

Referring back to FIG. 3, the navigation apparatus determines a position parameter in operation 340, and determines a lane change in operation 350. For example, the navigation apparatus may determine a map-based lane by matching, to map data, valid GPS data at a current time point, and determine a sensor-based lane by applying a lane change trigger to a sensor-based position of a target device at the current time point. The sensor-based position of the target device at the current time point may be calculated by applying DR to a position of the target device at a previous time point. The lane change trigger may be generated by comparing a positional change in a lateral direction of the target device and a lane width, and may have a value corresponding to the number of changed lanes. Subsequently, the navigation apparatus may compare the map-based lane with the sensor-based lane, and determine the position parameter of the target device at the current time point.

Figure 8:
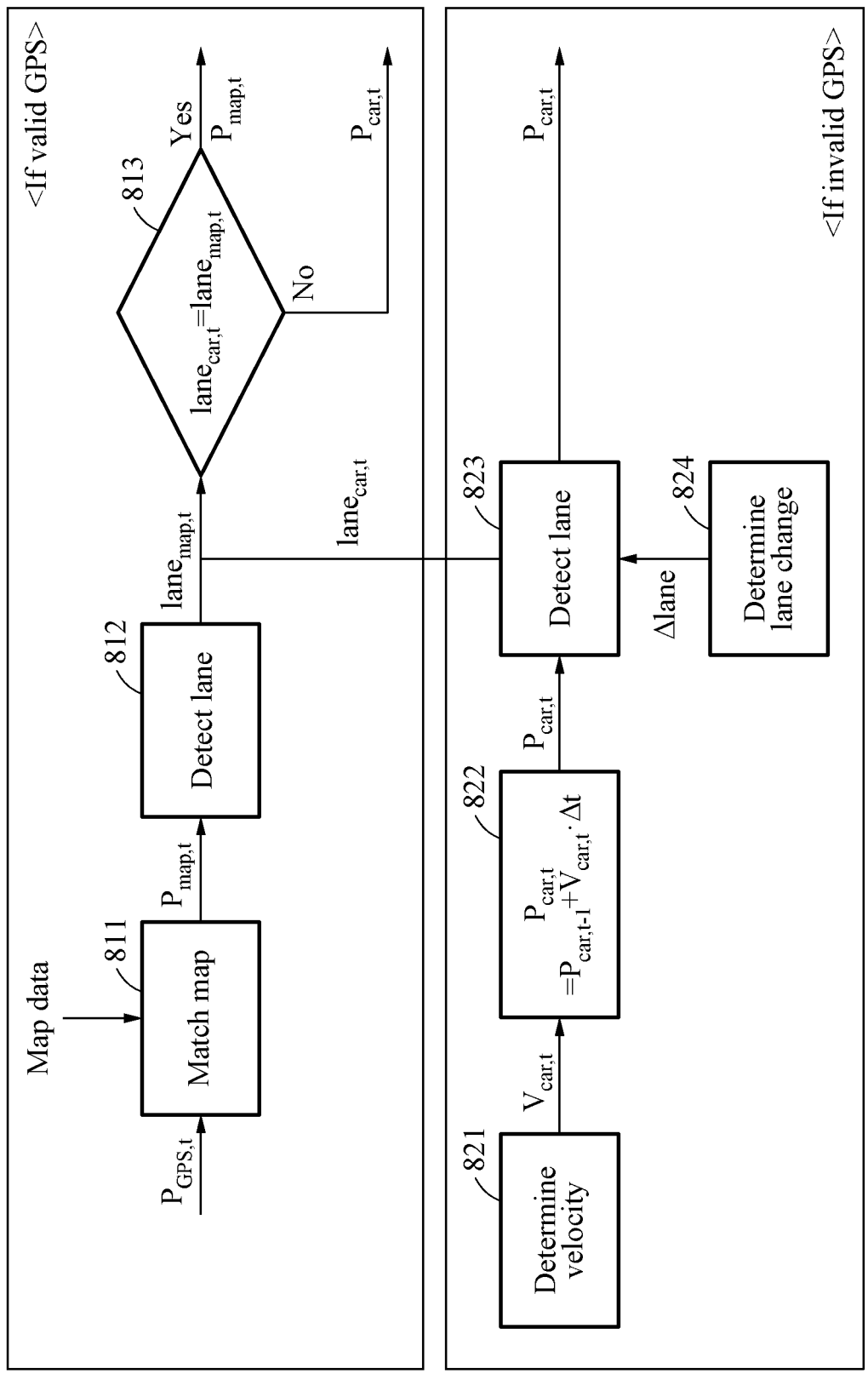
FIG. 8 is a diagram illustrating an example of determining a position parameter.

FIG. 8 is a diagram illustrating an example of determining a position parameter. Referring to FIG. 8, operations 811, 812, and 813 may correspond to a case in which valid GPS data is obtained, and operations 821, 822, 823, and 824 may correspond to a case in which valid GPS data is not obtained. However, even when the valid GPS data is obtained, some of operations 821 through 824 may be performed to provide necessary data to perform operations 811 through 813.

In operation 811, a navigation apparatus may perform map matching based on map data and a GPS-based position $P_{GPS,t}$ corresponding valid GPS data at a current time point. A map-based position $P_{map,t}$ may be generated as a result of the map matching. The navigation apparatus may match, to the map-based position $P_{map,t}$, a center of a lane closest to the GPS-based position $P_{GPS,t}$.

In operation 812, the navigation apparatus may detect a lane based on the map-based position $P_{map,t}$. In this operation, a map-based lane $lane_{map,t}$ may be generated as a result of such lane detection. Through operation 812, a lane corresponding to a target device may be detected among various lanes on a road on which the target device is located. In operation 813, the navigation apparatus may compare the map-based lane $lane_{map,t}$ with a sensor-based lane $lane_{car,t}$. The sensor-based lane $lane_{car,t}$ may be determined through operation 823.

In response to the map-based lane $lane_{map,t}$ and the sensor-based lane $lane_{car,t}$ corresponding to each other, the map-based position $P_{map,t}$ may be determined to be a position parameter. In contrast, in response to the map-based lane $lane_{map,t}$ and the sensor-based lane $lane_{car,t}$ not corresponding to each other, a sensor-based position $P_{car,t}$ may be determined to be the position parameter. A lane change trigger $\Delta lane$ may be generated based on a sensor, and may thus be used to provide relatively accurate lane information. Thus, only when the map-based lane $lane_{map,t}$ corresponds to the sensor-based lane $lane_{car,t}$ that is based on the lane change trigger $\Delta lane$, the map-based position $P_{map,t}$ may be adopted as the position parameter.

In operation 821, the navigation apparatus may determine a velocity parameter $V_{car,t}$. Operation 821 may correspond to operation 330 described above with reference to FIG. 3. In operation 822, the navigation apparatus may calculate the sensor-based position $P_{car,t}$ at the current time point by applying DR to a sensor-based position $P_{car,t-1}$ at a previous time point. Here, the DR may be performed based on a variation $\Delta\psi_{steer}$ in the velocity parameter $V_{car,t}$ during $\Delta t$.

In operation 823, the navigation apparatus may determine the lane-based lane $lane_{car,t}$ by applying the lane change trigger $\Delta lane$ to the sensor-based position $P_{car,t-1}$. In operation 824, the navigation apparatus may generate the lane change trigger $\Delta lane$ by determining a lane change. For example, the navigation apparatus may generate the lane change trigger $\Delta lane$ by comparing a change in a position of the target device in a lateral direction, and a lane width. When the valid GPS data is not obtained, the sensor-based position $P_{car,t}$ may be determined to be the position parameter.

Figure 9:
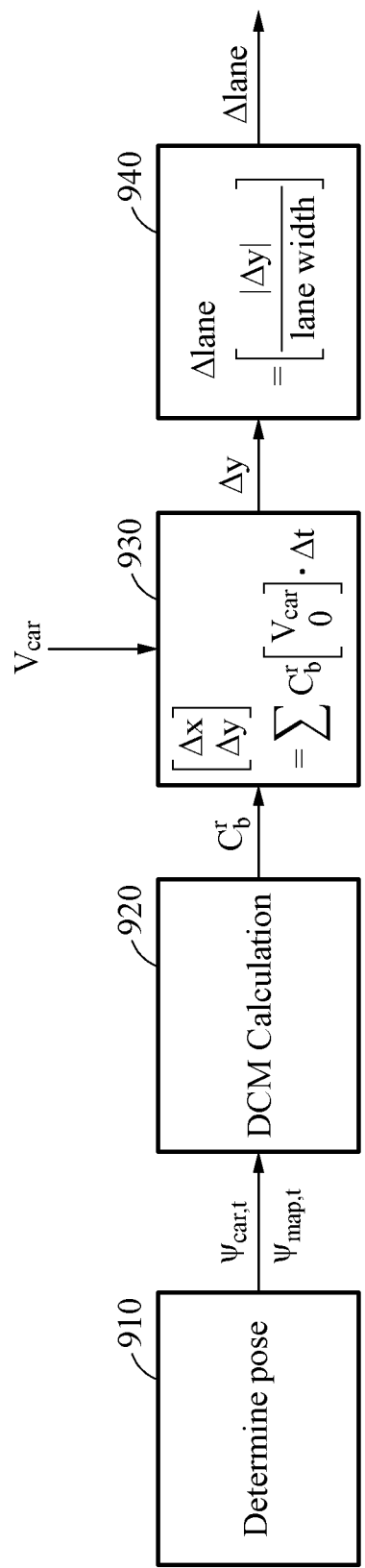
FIG. 9 is a diagram illustrating an example of determining a lane change.

FIG. 9 is a diagram illustrating an example of determining a lane change. Referring to FIG. 9, in operation 910, a navigation apparatus may determine a pose parameter. Operation 910 may correspond to operation 320 described above with reference to FIG. 3. In operation 920, the navigation apparatus may calculate $$DCM(C_b^n)$$

based on a sensor-based yaw parameter $\psi_{car,t}$ and a map-based yaw parameter $\psi_{map,t}$.

$$DCM(C_b^n)$$

may correspond to a difference between the sensor-based yaw parameter $\psi_{car,t}$ and the map-based yaw parameter $\psi_{map,t}$. The map-based yaw parameter $\psi_{map,t}$ may correspond to either one of a map-based first yaw parameter $\psi_{map1,t}$ and a map-based second yaw parameter $\psi_{map2,t}$ that is finally determined to be the pose parameter.

In operation 930, the navigation apparatus may calculate a positional change $\Delta x$ in a longitudinal direction and a positional change $\Delta y$ in a lateral direction based on $$DCM(C_b^n),$$

a sensor-based velocity $V_{car}$, and $\Delta t$.

$$\begin{bmatrix} \Delta x \\ \Delta y \end{bmatrix} = \sum C_b^r \begin{bmatrix} V_{car} \\ 0 \end{bmatrix} \cdot \Delta t \qquad \text{[Equation 7]}$$

In operation 940, the navigation apparatus may generate a lane change trigger $\Delta$lane by comparing the positional change $\Delta y$ in the lateral direction and a lane width. As a travel distance of the target device in the longitudinal direction is accumulated, the positional change $\Delta y$ in the lateral direction may increase. Thus, when a magnitude of the positional change $\Delta y$ in the lateral direction exceeds the lane width, the lane change trigger $\Delta$lane may be generated. The lane change trigger $\Delta$lane may have a value corresponding to the number of changed lanes.

Figure 10:
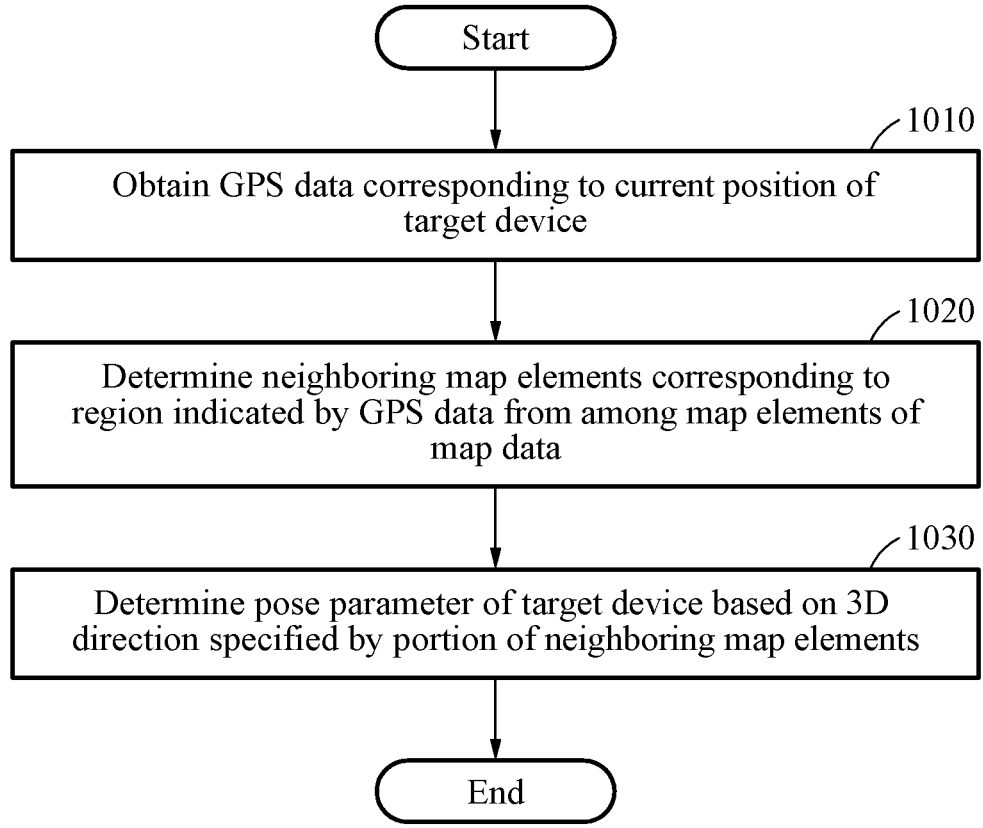
FIG. 10 is a flowchart illustrating an example of an operation method of a navigation apparatus.

FIG. 10 is a flowchart illustrating an example of an operation method of a navigation apparatus. Referring to FIG. 10, in operation 1010, a navigation apparatus may obtain valid GPS data at a current time point corresponding to a current position of a target device. In operation 1020, the navigation apparatus may determine first neighboring map elements corresponding to a first region indicated by the valid GPs data at the current time point from among a plurality of map elements of map data. In operation 1030, the navigation apparatus may determine a pose parameter of the target device at the current time point based on a first direction specified by at least a portion of the first neighboring map elements. The navigation apparatus may also perform operations described above with reference to FIGS. 1 through 9, and a more detailed and repeated description will be omitted here for brevity.

Figure 11:
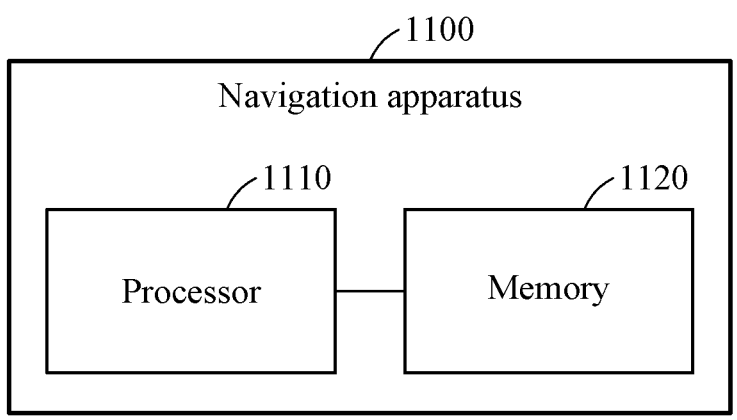
FIG. 11 is a diagram illustrating an example of a configuration of a navigation apparatus.

FIG. 11 is a diagram illustrating an example of a configuration of a navigation apparatus. Referring to FIG. 11, a navigation apparatus 1100 may include a processor 1110 and a memory 1120. The memory 1120 may be connected to the processor 1110 and configured to store instructions to be executed by the processor 1110, and data to be processed by the processor 1110 and/or data having been processed by the processor 1110. The memory 1120 may include a non-transitory computer-readable storage medium, for example, a high-speed random-access memory (RAM) and/or a non-volatile computer-readable storage medium (e.g., at least one disk storage device, flash memory device, or other nonvolatile solid-state memory devices).

The processor 1110 may execute instructions to perform one or more, or all, of operations and methods described above with reference to FIGS. 1 through 10. For example, the processor 1110 may obtain valid GPS data at a current time point corresponding to a current position of a target device, determine first neighboring map elements corresponding to a first region indicated by the valid GPS data at the current time point from among a plurality of map elements of map data, and determine a pose parameter of the target device at the current time based on a first direction indicated by at least a portion of the first neighboring map elements. In addition, the navigation apparatus 1100 may perform other operations and methods described above with reference to FIGS. 1 through 10, and a more detailed and repeated description of such operations and methods will be omitted here for brevity.

The navigation apparatuses 100 and 1100, the processor 1110, the memory 1120, the other navigation apparatuses, processors, and memories, the other apparatuses, devices, units, modules, and other components in FIGS. 1 to 11 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An operation method of a navigation apparatus connected to a target device, the operation method comprising:
    obtaining global positioning system (GPS) data at a current time point corresponding to a current position of the target device, including determining validity of the GPS data at the current time point dependent on a comparison to sensor-measured data different from GPS-based data from the GPS data;
    determining first neighboring map elements corresponding to a first region indicated by the GPS data at the current time point from among a plurality of map elements of map data; and
    determining a pose parameter of the target device at the current time point based on another GPS data of the target device at a previous time point and a first direction specified by at least a portion of the first neighboring map elements, including comparing a map-based yaw corresponding to the at least a portion of the first neighboring map elements to a determined GPS-based yaw at the current time point.

2. The operation method of claim 1, wherein the first direction is a three- dimensional (3D) direction.

3. The operation method of claim 1, wherein the pose parameter comprises a roll parameter, a pitch parameter, and a yaw parameter.

4. The operation method of claim 1, wherein the determining of the pose parameter at the current time point based on the first direction comprises identifying the first direction by performing line fitting with a plurality of points included in the first neighboring map elements and respectively corresponding to 3D positions.

5. The operation method of claim 1, wherein the determining of the pose parameter at the current time point based on the first direction comprises:
determining the GPS-based yaw based on the GPS data at the current time point and a position of the target device at the previous time point; and
extracting a sample from the first neighboring map elements by comparing the map-based yaw corresponding to the at least a portion of the first neighboring map elements to the determined GPS-based yaw.

6. The operation method of claim 5, wherein the determining of the pose parameter at the current time point based on the first direction further comprises identifying the first direction by applying a random sample consensus (RANSAC) algorithm to the extracted sample.

7. The operation method of claim 1, wherein the determining of the pose parameter at the current time point based on the first direction comprises determining the pose parameter by comparing a sensor-based yaw at the current time point and a map-based yaw corresponding to the first direction, and
wherein the sensor-based yaw at the current time point is calculated by applying a yaw rate measured through a steering sensor of the target device to a yaw of the target device at a previous time point.

8. The operation method of claim 7, wherein the pose parameter is determined to correspond to the first direction, in response to a difference between the sensor-based yaw and the map-based yaw being less than a threshold value.

9. The operation method of claim 1, further comprising:
determining a direction cosine matrix (DCM) corresponding to the determined pose parameter of the target device at the current time point; and
determining a velocity parameter of the target device at the current time point by applying the DCM to a velocity vector corresponding to a velocity of the target device at the current time point that is measured through a velocity sensor of the target device.

10. The operation method of claim 1, further comprising:
determining a map-based lane by matching the GPS data at the current time to the map data;
determining a sensor-based lane by applying a lane change to a sensor-based position of the target device at the current time point that is calculated by applying dead reckoning (DR) to a position of the target device at the previous time point; and
determining a position parameter of the target device at the current time point by comparing the map-based lane and the sensor-based lane.

11. The operation method of claim 10, further comprising:
determining the lane change by comparing a lane width and a change in a position of the target device in a lateral direction.

12. The operation method of claim 1, wherein the determining of the validity of the GPS data at the current time point comprises:
obtaining the GPS data at the current time point corresponding to the current position of the target device;
determining a GPS-based velocity and a GPS-based yaw rate based on the obtained GPS data at the current time point and the other GPS data at the previous time point;
obtaining a sensor-based velocity measured through a velocity sensor of the target device and a sensor-based yaw rate measured through a steering sensor of the target device; and
determining the validity of the GPS at the current time point data based on a result of comparing the GPS-based velocity and the sensor-based velocity with a result of comparing the GPS-based yaw rate and the sensor-based yaw rate.

13. A non-transitory computer-readable storage medium storing instructions that, when executed by a processor, cause the processor to perform the operation method of claim 1.

14. A navigation apparatus mounted on a target device, comprising:
a processor configured to:
obtain global positioning system (GPS) data at a current time point corresponding to a current position of the target device, including determining validity of the GPS data at the current time point dependent on a comparison to sensor-measured data different from GPS-based data from the GPS data;
determine first neighboring map elements corresponding to a first region indicated by the GPS data at the current time point from among a plurality of map elements of map data; and
determine a pose parameter of the target device at the current time point based on another GPS data of the target device at a previous time point and a first direction specified by at least a portion of the first neighboring map elements, including comparing a map-based yaw corresponding to the at least a portion of the first neighboring map elements to a determined GPS-based yaw at the current time point.

15. The navigation apparatus of claim 14, wherein the processor is further configured to identify the first direction by performing line fitting with a plurality of points that are included in the first neighboring map elements and respectively correspond to three-dimensional (3D) positions.

16. The navigation apparatus of claim 14, wherein the processor is further configured to:
determine the GPS-based yaw based on the GPS data at the current time point and a position of the target device at the previous time point; and
extract a sample from the first neighboring map elements by comparing the map-based yaw corresponding to the at least a portion of the first neighboring map elements to the determined GPS-based yaw.

17. The navigation apparatus of claim 16, wherein the processor is further configured to:
identify the first direction by applying a random sample consensus (RANSAC) algorithm to the extracted sample.

18. The navigation apparatus of claim 14, wherein the processor is further configured to determine the pose parameter by comparing a sensor-based yaw at the current time point and a map-based yaw corresponding to the first direction, and
wherein the sensor-based yaw at the current time point is calculated by applying a yaw rate measured through a steering sensor of the target device to a yaw of the target device at a previous time point.

19. The navigation apparatus of claim 18, wherein the pose parameter is determined to correspond to the first direction, in response to a difference between the sensor-based yaw and the map-based yaw being less than a threshold value.

20. The navigation apparatus of claim 14, wherein the processor is further configured to, in response to the GPS data at the current time point being determined to be invalid:
- obtain a sensor-based position at the current time point that is calculated by applying dead reckoning (DR) to a previous position of the target device and corresponds to the current position of the target device;
- determine second neighboring map elements corresponding to a second region indicated by the obtained sensor-based position at the current time point from among the plurality of map elements; and
- determine the pose parameter of the target device at the current time point based on a second direction specified by at least a portion of the second neighboring map elements.

21. The navigation apparatus of claim 14, wherein the processor is further configured to:
- determine a direction cosine matrix (DCM) corresponding to the determined pose parameter of the target device at the current time point; and
- determine a velocity parameter of the target device at the current time point by applying the DCM to a velocity vector corresponding to a velocity of the target device at the current time point that is measured through a velocity sensor of the target device.

22. The navigation apparatus of claim 14, wherein the processor is further configured to:
- determine a map-based lane by matching the GPS data at the current time point to the map data;
- determine a sensor-based lane by applying a lane change trigger to a sensor-based position of the target device at the current time point that is calculated by applying dead reckoning (DR) to a position of the target device at the previous time point; and
- determine a position parameter of the target device at the current time point by comparing the map-based lane and the sensor-based lane.

23. The navigation apparatus of claim 22, wherein the processor is further configured to generate the lane change trigger by comparing a change in a position of the target in a lateral direction, and a lane width.

24. The navigation apparatus of claim 14, further comprising:
- a memory storing instructions,
- wherein the processor is configured to execute the instructions to perform the obtaining of the global positioning system (GPS) data, the determining of the first neighboring map elements, and the determining of the pose parameter.

\* \* \* \* \*